Patented Sept. 22, 1953

2,653,131

UNITED STATES PATENT OFFICE 2,653,131

ALUMINUM-CARBON BLACK THICKENED GREASE COMPOSITIONS

Rosemary O'Halloran, Roselle Park, N. J., assignor to Standard Oil Development Company, a corporation of Delaware No Drawing. Application March 29, 1951, Serial No. 218,260

5 Claims. (Cl. 252—22)

This invention relates to lubricating grease compositions and particularly to lubricating grease containing carbon black combined therein. More particularly the invention relates to aluminum soap lubricating grease compositions containing carbon black combined therein useful for lubricating heavy moving parts under conditions of extreme pressure, high temperature, and high humidity.

It is known in the art that lubricating greases having outstanding high temperature properties and resistance to moisture may be prepared by thickening various lubricating oils with carbon black. These lubricating grease compositions have found outstanding utility in such industrial applications as steel mill roller bearing lubricating. In U. S. Patent No. 2,453,153 it is shown that superior lubricating greases may be prepared from carbon blacks and oil. Copending application Serial No. 213,464 discloses that a high temperature blending of carbon black and soaps results in an improved grease, particularly with regard to non-staining tendencies.

It is believed that the carbon black particles solidify the oil by entrapping it within groups or strands of carbon black particles. This entrapment is very resistant to heat, and carbon black greases show essentially no melting point. However, the carbon black structure so formed is not as resistant as conventional soap systems to separation by means of pressure, and it has been found that this effects a practical limitation on the applicability of such carbon black greases in industry. Particularly is this deficiency observed in the lubrication of heavy equipment which operates continuously under extreme conditions of heat and load. It is a widespread practice in industry to provide for assured, continuous lubrication of all the parts of such equipment by the use of automatic lubricant dispensers.

It is essential that the lubricating grease compositions used in automatic dispensers have a low degree of oil separation. This is due to the fact that when it becomes necessary to shut down the equipment the lubricating grease used in the continuous greasing dispensers is maintained immobile under pressure. If the oil component of the grease tends to separate gradually under these conditions an undesirable plugging of the grease lines results, necessitating operational delay for the purpose of cleaning the continuous greasing equipment. It has been found that the carbon black greases of the prior art are at a disadvantage under these conditions because of their tendency to separate oil under pressure, and to form plugs of dry carbon black which block the system.

It has now been found, and forms an object of this invention, that this disadvantage of carbon black greases may be obviated by incorperating into a carbon black grease a minor amount of an aluminum soap of a substantially saturated high molecular weight fatty acid. The incorporation of a small amount of aluminum soap reduces the tendency of oil separation markedly and enables users of continuous greasing equipment to utilize the desirable high temperature and water resistant characteristics of carbon black greases. It is believed that the aluminum soap (a well known gelling agent) holds the oil much more firmly than does carbon black. Improved performance in this respect is the particular result of using aluminum soap and incorporating the carbon black into cooled pre-formed soap-oil gel.

The use of other soaps, such as sodium, lithium, barium, magnesium, strontium, calcium, etc., with carbon black results only in minor improvements in oil separation properties under pressure. Also, it is to be noted, where the aluminum soap is incorporated into the carbon black before it gels (i. e., while still above its transition temperature) no marked improvement is shown. Therefore, the improvements shown by the products of the invention appear to be very specific and limited to the composition and method of manufacture outlined above, that is incorporation of the carbon black into a cooled, pre-formed aluminum soap-oil gel.

Although use in continuous greasing equipment brings out an outstanding advantage of the novel greases of invention, it is readily recognized that these greases have wide utility in industrial application in view of their outstanding properties of high temperature resistance, water resistance, lack of oil separation, and high dropping point.

The novel greases may be prepared using any of the aluminum soaps of the commonly known grease making materials such as fish oil acids, beef fat, tallow, oleic acid, stearic acid, hydroxystearic acid, the saturated or unsaturated glycerides of the fatty acids, or mixtures of the above. Commercial aluminum stearate is entirely satisfactory. Amounts of the aluminum soap varying between 1.5 to 10% may be used depending upon the desired final consistency. Amounts over 4% will give very stiff greases when compounded with carbon black. In order to prepare greases of soft consistency and improved oil separation resistance, only a small amount, that is 1.5% to 3.5% of aluminum soap is required. Mixed soaps, for example, the aluminum soap of a mixture of naphthenic and fatty acids, such as "Napalm," are very strong gelling agents and can be employed in place of the straight fatty acid soaps.

The carbon black of the greases of the invention may be any of the amorphous forms of carbon black, such as channel blacks, acetylene black, color blacks, and the like. Amounts varying between 3% to 30% by weight based on the weight of the total composition may be used. 5% to 15% by weight is especially preferred. Selection of the type of carbon black will depend on the ultimate use and properties desired in the grease.

The mineral oil utilized in the preparation of the greases of invention may vary widely, depending upon the use to which the resulting grease composition is to be put. A mineral oil, either residual or distillate, of a paraffinic, naphthenic or mixed base crude having a viscosity in the range from about 50 to 1,000 S. U. S. at 210° F. may be used. The viscosity of the mineral oil used will depend upon the degree of dispensability desired in the finished grease.

Commonly known extreme pressure additives may be employed in amounts ranging from 2% to 30%, preferably 10% to 15% by weight based on the weight of the finished composition. Materials such as lead soaps, fatty acids, fatty oils, sulfurized fats, phosphorus compounds, chlorinated compounds, or mixtures of these additives may be added to impart additional extreme pressure properties to these greases, as is well known in the art. In the preparation of extreme pressure greases it has been found usually advantageous to use a low surface pH black or a mixture of high and low pH blacks.

The invention will be more fully illustrated by the following examples.

EXAMPLES I TO IX

In these examples, the desired amount of dehydrated soap was added to the total mineral oil charge a West Texas crude distillate having a viscosity at 210° F. of 70 S. U. S. and the mixture heated above the melting point of the soap (250–400° F.). The carbon black was added and stirred in at this high temperature and the grease allowed to pan cool. The cooled greases and extreme pressure agents were homogenized to the desired consistency. The finished greases were subjected to the standard ASTM dropping point test, and, in addition, to an oil separation test.

The oil separation test consisted of placing 50 g. of grease in a small cylinder terminated at the lower end by a double No. 1 filter paper and a 500 mesh metal screen. The top of the grease sample was then subjected to 100 pound nitrogen pressure. The total loss in weight of the grease due to oil passing through the filter paper (including the oil adsorbed by the paper) was observed after a 22 hour test period and represented the degree of oil separation.

EXAMPLES X TO XXII

In these preparations the dehydrated soap was added to the oil and the mixture heated until the soap was completely dispersed in the oil, that is, to temperatures within the range of from 250° F. to 400° F. The soap-oil solution was allowed to cool to a temperature below the transition temperature of the aluminum soap, generally described in United States Patent No. 2,343,736. Carbon black was added to the mixture below the transition temperature of the soap and extreme pressure additives blended in followed by homogenization. These greases were also tested for dropping point and oil separation properties.

The data on the greases prepared in accordance with Examples I–XXII are reported in Table I below. Comparative data on four commercially used greases are also shown.

Table I

CARBON BLACK–SOAP GREASES

| Example [1] | Soap Type | Wt. Percent | Carbon Black Type | Wt. Percent | Blending Temp., °F. | Dropping Point, °F. | Oil Separation, grams |
|---|---|---|---|---|---|---|---|
| I | Lithium | 4 | Acetylene | 6 | 400 | 500+ | 6.8. |
| II | Sodium | 4 | do | 6 | 300 | 367 | not determined. |
| III | Magnesium | 4 | do | 6 | 300 | 500+ | 5.5. |
| IV | Calcium | 8 | do | 8 | 300 | 500+ | 7.1. |
| V | Strontium | 4 | do | 6 | 400 | 500+ | 6.9. |
| VI | Barium | 4 | do | 6 | 400 | 500+ | 6.3. |
| VII | Aluminum | 2 | do | 10 | 300 | 500+ | 8.4. |
| VIII | do | 3 | do | 8 | 300 | 420 | not determined. |
| IX | do | 7 | do | 8 | 300 | 500+ | not determined, grease very heavy. |
| X | Lithium | 4 | do | 6 | 80–100 | 296 | not determined. |
| XI | do | 4 | do | 10 | 80–100 | 500+ | 7.6. |
| XII | Sodium | 4 | do | 10 | 80–100 | 340 | 8.8. |
| XIII | Magnesium | 4 | do | 10 | 80–100 | 500+ | 6.2. |
| XIV | Calcium | 8 | do | 8 | 80–100 | 500+ | 6.4. |
| XV | Strontium | 4 | do | 6 | 80–100 | 180 | not determined. |
| XVI | Barium | 4 | do | 6 | 80–100 | 278 | Do. |
| XVII | do | 4 | do | 10 | 80–100 | 500+ | 6.9. |
| XVIII | Aluminum | 1 | do | 10 | 80–100 | 500+ | 11.7. |
| XIX | do | 2 | do | 10 | 80–100 | 500+ | 0.9. |
| XX | do | 3 | do | 10 | 80–100 | 500+ | 1.0. |
| XXI [1] | do | 3 | do | 10 | 80–100 | 500+ | 1.0. |
| XXII | do | 3 | Color Black | 10 | 80–100 | 500+ | 1.0. |
| | Commercial XP Ca-Pb soap-Ca acetate grease | | | | | 500+ | 3.2. |
| | Commercial XP Ca-Pb soap grease | | | | | 168 | 4.0. |
| | Commercial XP Ca soap grease | | | | | 180 | 4.4. |
| | Commercial XP carbon black-Pb soap grease | | | | | 500+ | 8.6. |

[1] Greases I–XX and XXII contained 13 wt. percent of an extreme pressure agent comprising a lead soap and sulfurized fatty oil. Grease XXI contained no extreme pressure agent.

An examination of the data in Table I above clearly points out the advantage of the inventive concept.

The greases of Examples I through IX were prepared by blending various amounts of the carbon black into the soap-oil mixture at temperatures above the transition temperature of the metal soap. It will be noted that the high dropping points of the resulting grease compositions indicate that very satisfactory high temperature performance is to be expected. However, the degree of oil separation shows that the stability of the system is insufficient for the greases to be operable in continuous greasing equipment and allied uses.

In Examples X through XXII the greases were prepared by adding the carbon black to the soap-oil system below the transition temperature of the soap used. In Examples X through XVII it is shown that the soaps of lithium, sodium, magnesium, calcium, strontium, and barium, commonly used as grease thickeners, form valuable high temperature greases as their high dropping points indicate, but do not form a sufficiently stable system to prevent undesirable oil separation under the conditions encountered in continuous greasing equipment. In Examples XVIII through XXII however, both desirable high dropping points and low degrees of oil separation were obtained, indicating that the aluminum soap-carbon black greases prepared in accordance with the inventive concept, are excellently suited for high temperature uses generally, and are very satisfactory for use in continuous greasing equipment.

It is also contemplated that the greases of invention may be prepared by a continuous process. Such a process may include the preparation of the aluminum soap solution, drawing off into tanks from which it could be pumped back when cool into the original mixing kettle previously charged with carbon black. The finished grease could then be pumped from the mixing kettle through a suitable homogenizer to result in a finished grease composition.

To summarize briefly, this invention relates to improved carbon black grease compositions prepared by a process comprising the steps of forming the aluminum soap of a high molecular weight fatty acid, or mixtures of such soap with other aluminum soaps, dispersing said soap in the desired mineral oil by heating, allowing the solution to cool to a temperature below the transition temperature of the soap, dispersing in the soap-oil gel the desired amount of carbon black, and homogenizing the composition to the desired consistency. Extreme pressure agents may or may not be added as desired.

What is claimed is:

1. An improved process for the formation of lubricating grease compositions containing combined therein carbon black which comprises the steps of admixing from 1.5% to 10.0% by weight of an aluminum soap of high molecular weight substantially saturated fatty acid in a mineral oil, heating said mixture to completely disperse said soap in said oil, cooling the dispersion below the transition temperature of said aluminum soap, blending with said cooled soap-oil solution from 3% to 30% by weight of an amorphous carbon black, and working the resulting blend until the desired consistency is obtained.

2. An improved process for the formation of lubricating grease compositions containing combined therein carbon black which comprises the steps of admixing from 1.5% to 3.5% by weight of an aluminum soap of high molecular weight substantially saturated fatty acid in a mineral oil, heating said mixture to completely disperse said soap in said oil, cooling the dispersion below the transition temperature of said aluminum soap, blending with said cooled soap-oil solution from 5% to 15% by weight of an amorphous carbon black, and working the resulting blend until the desired consistency is obtained.

3. A process according to claim 2 wherein the aluminum soap is aluminum stearate.

4. A process according to claim 2 wherein 10% of the carbon black is used.

5. An improved process for the formation of lubricating grease compositions containing combined therein carbon black which comprises the steps of admixing from 1.5% to 3.5% by weight of the aluminum soap of a high molecular weight substantially saturated fatty acid in a mineral lubricating oil having a viscosity at 210° F. within a range of from about 50 to 1,000 S. U. S., heating said mixture to completely disperse said soap in said oil, cooling the dispersion below the transition temperature of said soap, blending with said cooled soap-oil solution from 5% to 15% by weight of an amorphous carbon black, adding to the blend from 10% to 20% by weight of an extreme pressure additive, and working the resulting blend until the desired consistency is obtained.

ROSEMARY O'HALLORAN.

References Cited in the file of this patent

UNITED STATES PATENTS

| Number | Name | Date |
|---|---|---|
| 2,470,965 | Woods | May 24, 1949 |
| 2,480,647 | Gurd et al. | Aug. 30, 1949 |
| 2,487,260 | Morway | Nov. 8, 1949 |
| 2,522,460 | Morway et al. | Sept. 12, 1950 |
| 2,543,741 | Zweifel | Feb. 27, 1951 |